US010891693B2

(12) United States Patent
Huang et al.

(10) Patent No.: US 10,891,693 B2
(45) Date of Patent: Jan. 12, 2021

(54) METHOD AND SYSTEM TO DETERMINE AUTO INSURANCE RISK

(71) Applicant: International Business Machines Corporation, Armonk, NY (US)

(72) Inventors: He Yuan Huang, Beijing (CN); Ning Duan, Beijing (CN); Zhi Hu Wang, Beijing (CN); Kai Li, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 473 days.

(21) Appl. No.: 14/883,839

(22) Filed: Oct. 15, 2015

(65) Prior Publication Data

US 2017/0109827 A1    Apr. 20, 2017

(51) Int. Cl.
 *G06Q 40/08* (2012.01)
 *G07C 5/08* (2006.01)
 *G07C 5/00* (2006.01)

(52) U.S. Cl.
 CPC ............. *G06Q 40/08* (2013.01); *G07C 5/008* (2013.01); *G07C 5/0808* (2013.01)

(58) Field of Classification Search
 None
 See application file for complete search history.

(56) References Cited

U.S. PATENT DOCUMENTS

| 8,117,049 | B2 * | 2/2012 | Berkobin | G06Q 40/08 340/500 |
| 8,825,383 | B1 * | 9/2014 | Kirmse | G01C 21/3415 701/426 |
| 9,107,076 | B1 * | 8/2015 | Zang | H04W 12/12 |
| 9,141,995 | B1 * | 9/2015 | Brinkmann | G06Q 40/08 |
| 9,189,899 | B2 * | 11/2015 | Cook | G07C 5/085 |
| 9,628,958 | B1 * | 4/2017 | McBurney | H04W 4/027 |
| 10,248,804 | B2 * | 4/2019 | Valacich | A61B 5/7475 |
| 2008/0077451 | A1 * | 3/2008 | Anthony | G06Q 10/10 705/4 |
| 2010/0094664 | A1 * | 4/2010 | Bush | G06Q 10/10 705/4 |
| 2013/0006674 | A1 * | 1/2013 | Bowne | G06Q 10/0639 705/4 |
| 2014/0095212 | A1 * | 4/2014 | Gloerstad | G06Q 40/08 705/4 |
| 2014/0108058 | A1 * | 4/2014 | Bourne | G06Q 40/08 705/4 |

(Continued)

OTHER PUBLICATIONS

Yong Ge, et al., "A Taxi Driving Fraud Detection System", National Key Laboratory for Novel Software Technology, Nanjing University, China, pp. 1-10.

*Primary Examiner* — William J Jacob
(74) *Attorney, Agent, or Firm* — Joseph Petrokaitis, Esq.; McGinn IP Law Group, PLLC

(57) ABSTRACT

A method for evaluating fraudulent data in a Usage Based Insurance (UBI) system, includes retrieving trip data for a driver from a database. A processor on a computer determines tough context incidents in the trip data. Driving behavior of the driver during said tough context incidents is compared with driving behavior of other drivers during similar tough context incidents. The trip data is identified as potentially fraudulent if the driver's driving behavior is better by a predetermined amount compared to the other drivers' driving behavior.

18 Claims, 12 Drawing Sheets

(56) References Cited

U.S. PATENT DOCUMENTS

| | | | | |
|---|---|---|---|---|
| 2014/0335902 A1* | 11/2014 | Guba | .................... | H04W 4/027 455/456.4 |
| 2015/0154712 A1* | 6/2015 | Cook | .................... | G06Q 40/08 705/4 |

* cited by examiner

Driving Behaviors 302

Sped Patterns: 306
- Free Flow
- Steady Flow
- Congestion
- Severe Congestion
- Mixed Condition

Traffic Periods: 308
- Morning Peak: 7:00-10:30
- Evening Peak: 17:30-20:30
- Day: 10:30-17:30
- Night: 20:30-7:00

Road Types 304

| DRIVING BEHAVIOR | NUMBER | ICON |
|---|---|---|
| SPEED RELATED | | |
| Anxious Acceleration | 521 | 1 |
| Harsh Braking | 1822 | 2 |
| Overspeed | 1375 | 3 |
| Frequent Stops | N/A | 4 |
| Frequent Accelerations | N/A | 5 |
| Frequent Braking | N/A | 6 |
| TURN RELATED | | |
| Acceleration Before Turn | 134 | 7 |
| Brake Out Turn | 20 | 8 |
| Sharp Turn (High Speed Turn) | 567 | 9 |
| OTHER | | |
| Fatique Driving (Tired Driving) | 3 | 10 |

| MoMA Road Type | OSM Road Type | Speed Limitation |
|---|---|---|
| Highway/Motorway | Motorway | 120 km/h |
| Main extra-urbanroad/ urban-highway | Trunk | 90 km/h |
| Secondary Extra-urban road/urban primary | Primary | 60 km/h |
| Urban-road | Secondary, Tertiary | 40 km/h |
| Others/Urban path or alley | Unclassified, residential, service | 30 km/h |
| Unknown | N/A | N/A |

| Specific tier of Road (ID) | Frustration | Road Type | MILEAGE TOTAL | BEHAVIORS | DECELERATION | ANY 0 0 ACCELERATION | ANY 0 5 ACCELERATION | ANY 0 5 1 00 | ANY 1 00 |
|---|---|---|---|---|---|---|---|---|---|
| Steady FLOW | Morning Rushhour | Secondary Extra-urb | 51101.18 | 105.00 | 1.00 | 0.25 | 0.00 | 0.25 | 13.00 |
| Free Flow | Day | UNKNOWN | 43916.91 | 41.00 | 4.00 | 0.09 | 0.10 | 0.11 | 5.00 |
| Free Flow | Night | UNKNOWN | 48553.08 | 54.00 | 3.00 | 0.10 | 0.14 | 0.12 | 6.00 |
| Free Flow | Morning Rushhour | UNKNOWN | 14922.43 | 6.00 | 2.00 | 0.00 | 0.00 | 0.00 | 0.00 |
| Free Flow | Evening Rushhour | UNKNOWN | 10697.30 | 17.00 | 4.00 | 0.32 | 0.43 | 0.28 | 3.00 |
| Free Flow | Day | Highway/motor way | 485533.94 | 647.00 | 4.00 | 0.18 | 0.14 | 0.29 | 142.00 |
| Free Flow | Night | Highway/motor way | 613618.66 | 680.00 | 2.00 | 0.17 | 0.13 | 0.21 | 129.00 |
| Free Flow | Morning Rushhour | Highway/motor way | 154841.28 | 175.00 | 1.00 | 0.02 | 0.02 | 0.05 | 7.00 |
| Free Flow | Evening Rushhour | Highway/motor way | 6321.75 | 0.00 | 2.00 | 0.00 | 0.00 | 0.00 | 0.00 |
| Free Flow | Day | Main extra-urban r | 9374.90 | 10.00 | 3.00 | 0.00 | 0.00 | 0.00 | 0.00 |
| Free Flow | Night | Main extra-urban r | 20379.27 | 14.00 | 3.00 | 0.04 | 0.05 | 0.05 | 1.00 |
| Free Flow | Morning Rushhour | Main extra-urban r | 1679.66 | 0.00 | 1.00 | 0.00 | 0.00 | 0.00 | 0.00 |
| Free Flow | Evening Rushhour | Main extra-urban r | 12201.06 | 0.00 | 2.00 | 0.00 | 0.00 | 0.00 | 0.00 |
| Free Flow | Day | Secondary Extra-urb | 11926.66 | 14.00 | 4.00 | 0.00 | 0.00 | 0.00 | 0.00 |
| Free Flow | Night | Secondary Extra-urb | 62419.48 | 75.00 | 3.00 | 0.01 | 0.02 | 0.03 | 2.00 |
| Free Flow | Morning Rushhour | Secondary Extra-urb | 110533.46 | 81.00 | 1.00 | 0.07 | 0.00 | 0.07 | 8.00 |
| Free Flow | Evening Rushhour | Secondary Extra-urb | 25559.59 | 17.00 | 2.00 | 0.00 | 0.00 | 0.00 | 0.00 |
| Free Flow | Day | Urban-road | 40398.07 | 106.00 | 4.00 | 0.00 | 0.00 | 0.00 | 0.00 |
| Free Flow | Night | Urban-road | 32247.30 | 102.00 | 3.00 | 0.15 | 0.13 | 0.09 | 3.00 |
| Free Flow | Morning Rushhour | Urban-road | 2122.48 | 11.00 | 2.00 | 0.77 | 0.77 | 0.94 | -2.00 |
| Free Flow | Evening Rushhour | Urban-road | 12324.15 | 17.00 | 2.00 | 0.00 | 0.00 | 0.00 | 0.00 |
| Free Flow | Day | Others/Urban path | 1978.57 | 19.00 | 4.00 | 2.82 | 4.02 | 2.02 | 4.00 |
| Free Flow | Night | Others/Urban path | 1512.89 | 2.00 | 1.00 | 0.00 | 0.00 | 0.00 | 0.00 |
| Free Flow | Morning Rushhour | Others/Urban path | 1319.44 | 9.00 | 2.00 | 1.86 | 1.86 | 3.03 | 4.00 |

A B C D E F G H I J

METHOD AND SYSTEM TO DETERMINE AUTO INSURANCE RISK

BACKGROUND

The present invention relates to detecting fraud, and more specifically, to detecting fraud in the usage-based automotive insurance model by using contextual data to check on a driver's representations for user-based coverage.

Usage-Based Insurance (UBI), also known as Pay As You Drive (PAYD) and Pay How You Drive (PHYD) and Mile-Based Auto Insurance (MBAI), is a type of vehicle insurance in which the cost is dependent upon such parameters as the type of vehicle used, time, place, distance of travel, and driving behavior. The simplest form of the UBI model bases the insurance cost simply on number of miles driven, but the UBI model also includes other schemes in which coverage is based on additional data collected from the vehicle, including, for example, information on speed, time of day, historic riskiness of the road, and driving actions, as well as the distance or time travelled.

In more sophisticated versions of the UBI model vehicle data is transmitted to an insurance processing center (e.g., telematic usage-based insurance), using an on-board telematic device connected, for example, to the vehicle's OnBoard Diagnostic (OBD-II) port, which has been available on automobiles built after 1996. At least one insurance carrier has experimented under the UBI model with using an app on the user's smart phone for transmitting vehicular data to the insurance company's processing center. Another carrier uses the transmission capabilities available to OnStar subscribers.

FIG. 1 shows automobile/driver 102 transmitting trip data under the UBI model to insurance processing center 104 via telematic device 106. The precise mechanism and path for transmitting the trip data to the insurance processing center is not important in the context of the present invention, since various mechanisms could be used, such as a mobile communication network, a satellite network, or direct sight networks that possibly interface with the Internet or similar known transmission mechanisms. Additionally, the present invention could be wholly or partially implemented as a cloud service.

The present inventors have recognized that, to get a lower insurance fee, a driver may have a motivation to provide faked data using various possible tools/techniques. For example, a fraudster might use a tool that has been pre-set with trip data intended to demonstrate good driving behavior. When driving, the tool would randomly send the pre-set faked trip to the insurance processing center. The overall profiling of the driver's driving behavior would thereby appear to be very good, and he or she could continue to get a significant discount on the insurance fee.

Fraud detection has been used in banking and insurance industries. Banking fraud is typically about transactions, and insurance fraud is typically about claims. However, this potential fraud in the UBI model is about fraudulently obtaining lower insurance fees, and the context of this type of fraud is very different from that of banking or insurance fraud. Moreover, the data analyzing the UBI context is geospatial data, which is very different from the data analyzed in conventional banking/insurance fraud detection scenarios.

Also, since UBI is itself a relatively new business model, new fraud techniques can be expected to evolve and new fraud detection techniques would need to evolve to address future potential fraud in the UBI insurance model. Thus, the present invention can be viewed as representing a technical solution to a technical problem that was not previously recognized in this recent technology-based UBI model.

SUMMARY

According to an embodiment of the present invention, a fraud detection technique uses contextual data associated with trip data reports as basis for a reality check of the received trip report data from specific drivers, in view of potential fraud.

In an exemplary embodiment, the reported driving conduct of specific drivers under tough contextual conditions is compared with statistical norms of other drivers under similar tough contextual conditions, with fraud being considered as possible if the specific driver's data in tough conditions indicate driving conduct significantly better than the statistical norms.

When such better driving conduct is detected, the driver can be identified in an output display format to insurance investigators to permit more specific evaluation, investigation, and possible action.

BRIEF DESCRIPTION OF THE DRAWINGS

FIG. 3 shows exemplary samples 300 of driving behaviors and contextual data;

FIG. 6 shows exemplary data 600 for contextual benchmark calculations for driving behavior;

DETAILED DESCRIPTION

Figure 1:
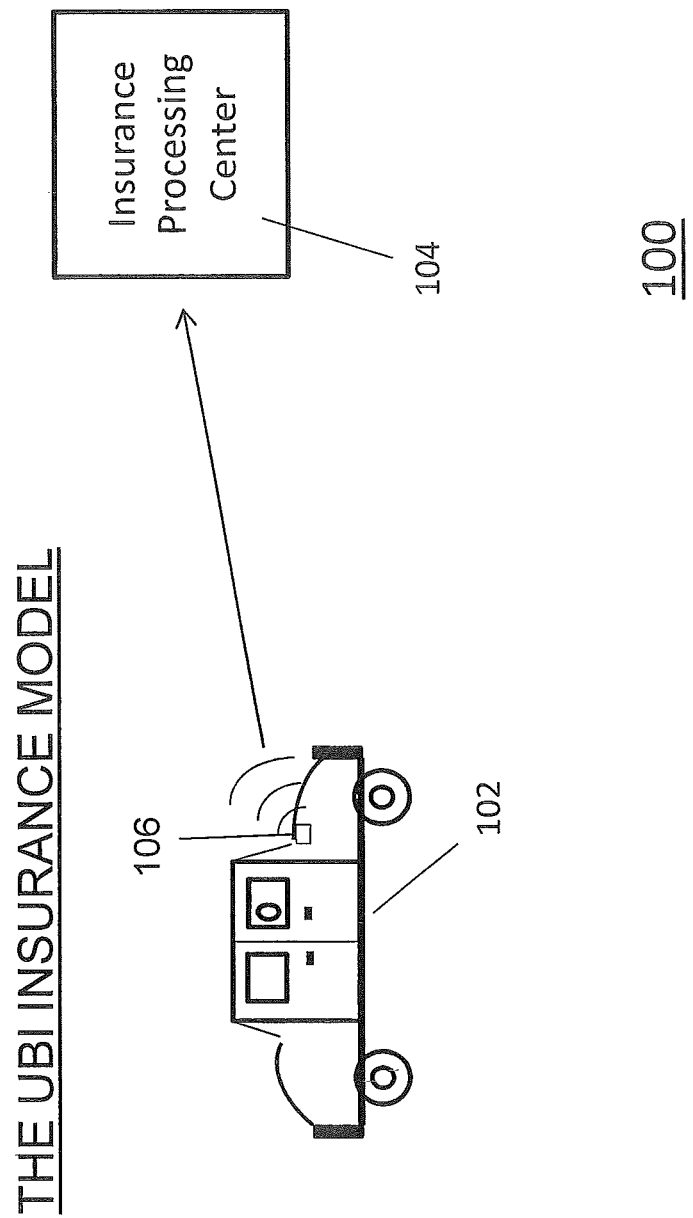
FIG. 1 shows a simplistic schematic 100 of UBI insurance data reporting.
Figure 2:
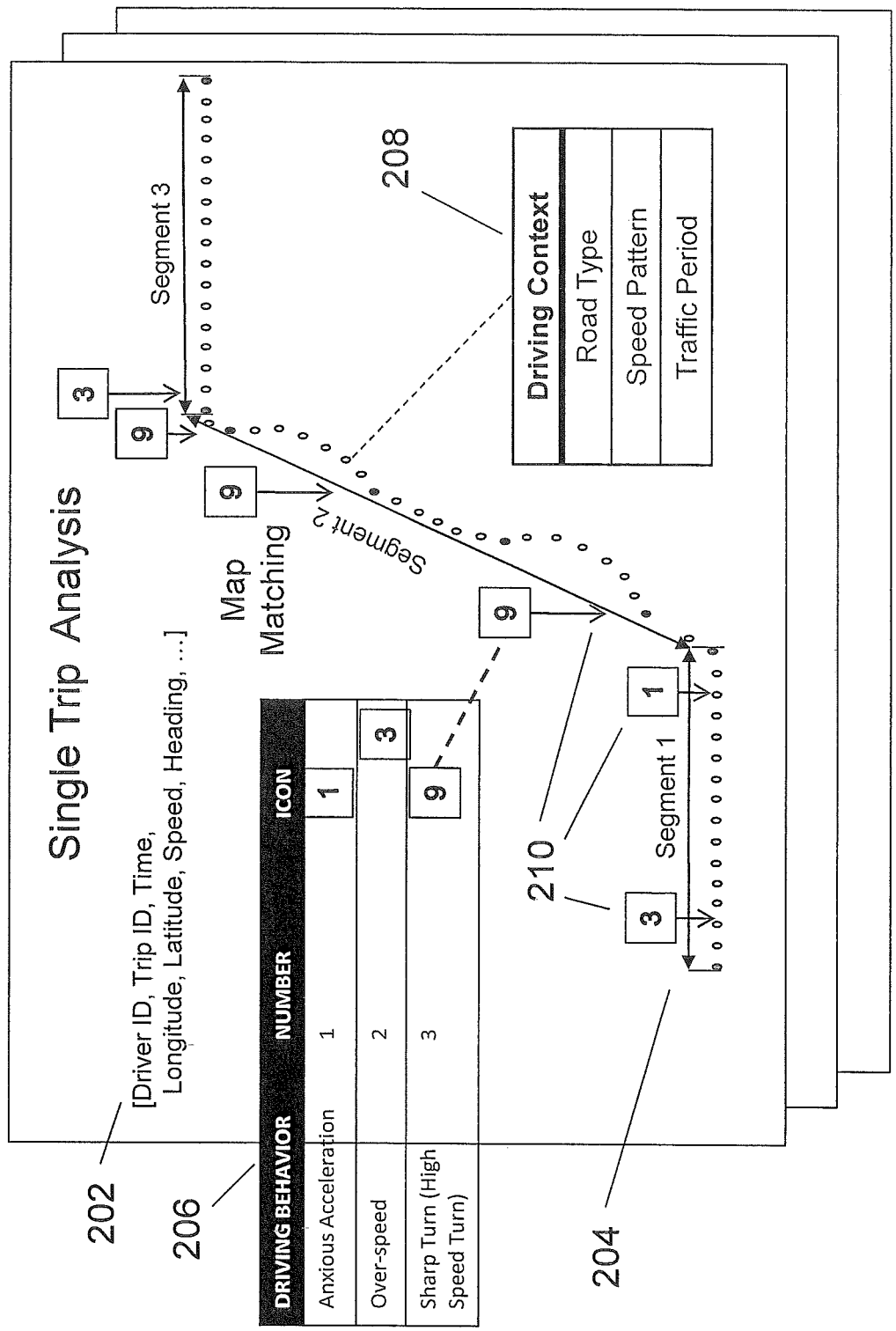
FIG. 2 shows exemplarily data transmissions for a single trip analysis 200.

With reference now to FIG. 2, in most versions, the UBI business model includes a provision that the insured driver carry some form of a risk meter 106 (FIG. 1) on trips for which the driver is receiving insurance coverage. The risk meter 106 is a data reporting device and can be a reporting device mounted in the insured's vehicle, such as attached to the OBD-II port, or could be implemented as a mobile app on the driver's smart phone or other mobile device. This risk meter 106, whether rigidly mounted in the vehicle or implemented as a mobile app on a portable smart device, provides trip-related data 202 periodically reported to the insurance processing center 104 for each trip 204. Such trip data 202 might include, for example, driver ID, trip ID, time stamp, longitude, latitude, speed, heading, etc.

A second type of data 206, 208 used in the present invention is referred to herein as "contextual data" or "context information", and includes information that can be ascertained concerning conditions and events outside the vehicle. Non-limiting and exemplary examples of contextual data include weather, road type, and traffic conditions. Another way to define context or contextual data or contextual information, in the context of the present invention, is to consider that contextual data includes at least some information that is not under control of the insured driver or the periodic reporting of data from the risk meter. "Tough contexts" or "tough contextual incidents" refer to those combinations of contextual data under such adverse conditions as bad weather or bad traffic conditions that would be considered more hazardous from an insurer's perspective.

Contextual data can be obtained in several possible ways. For example, weather data for the trip could be obtained from regional weather reports and/or forecasts via the Internet or other weather reporting channel. Traffic conditions for different segments of a trip could likewise be obtained from local traffic reports or could be surmised based on trip data such as speed and present location. Road type could be obtained from various mapping databases based on knowing the driver's current location. Some contextual data, such as driving behavior during any specific trip, can be ascertained from the reported driving data for that trip by, for example associating present locations with report data for speed, acceleration, braking, etc. By associating such weather, traffic data with each trip, one can then determine each driver's driving behavior under adverse conditions such as bad weather, heavy traffic congestion, risky roads, long driving periods, etc., to establish incidents of tough contexts for each individual driver as well as all drivers reporting data.

As shown in FIG. 2, reported trip data can be used to calculate one or more categories of driving behavior 206, such as speed-related behavior (e.g., anxious accelerations, harsh braking, over-speeding, etc.) and turn-related data (e.g., sharp turn, brake-out turn, acceleration-before-turn). All of these behaviors can be matched with locations 210 and adverse conditions such as bad weather or traffic, etc. FIG. 2 also demonstrates how driving behavior incidents can be correlated with specific locations 210 along a trip and that driving behavior 206 and driving context 208 can be detected or calculated or otherwise associated with trip data. Such contextual data might be collected, detected, or calculated by the risk meter 106. Alternatively, the insurance processing center 104 could add contextual data to the trip report data. The trip report data could be calculated or presented in spreadsheet format, which has the advantage that data can be summarized, either from individual trips or as aggregated over multiple trips and/or multiple drivers' trip data. Thus, in the context of the present invention, contextual data can be collected and/or calculated in either the risk device 106, the insurance processing center 104, or even a combination of the two. Contextual data could also be detected, calculated, and/or provided as a service outside either the insurance processing center or the automobile risk meter.

FIG. 3 shows ten (10) exemplary driving behavior patterns 302 and as arranged in "Speed Related", "Turn Related", and "Other" categories. However, it should be clear to one of ordinary skill in the art that other driving behavior patterns and other categories are possible. Since current location and time are typically reported by the risk meter data, additional driving context data can also be derived by further calculations in the risk meter or at the insurance processing center, including, for example, road types 304, speed patterns 306, and traffic period 308. As mentioned, such information as road type 304 would be readily available from a map database, once the user driver's current location is reported, and that speed pattern 306 and traffic period information 308 is available by simple techniques once current time is reported. Also as mentioned, contextual data 302, 304, 306, 308, plus, for example, weather, can be calculated in the risk meter 106 or could be calculated in the insurance processing center 104.

Figure 4:
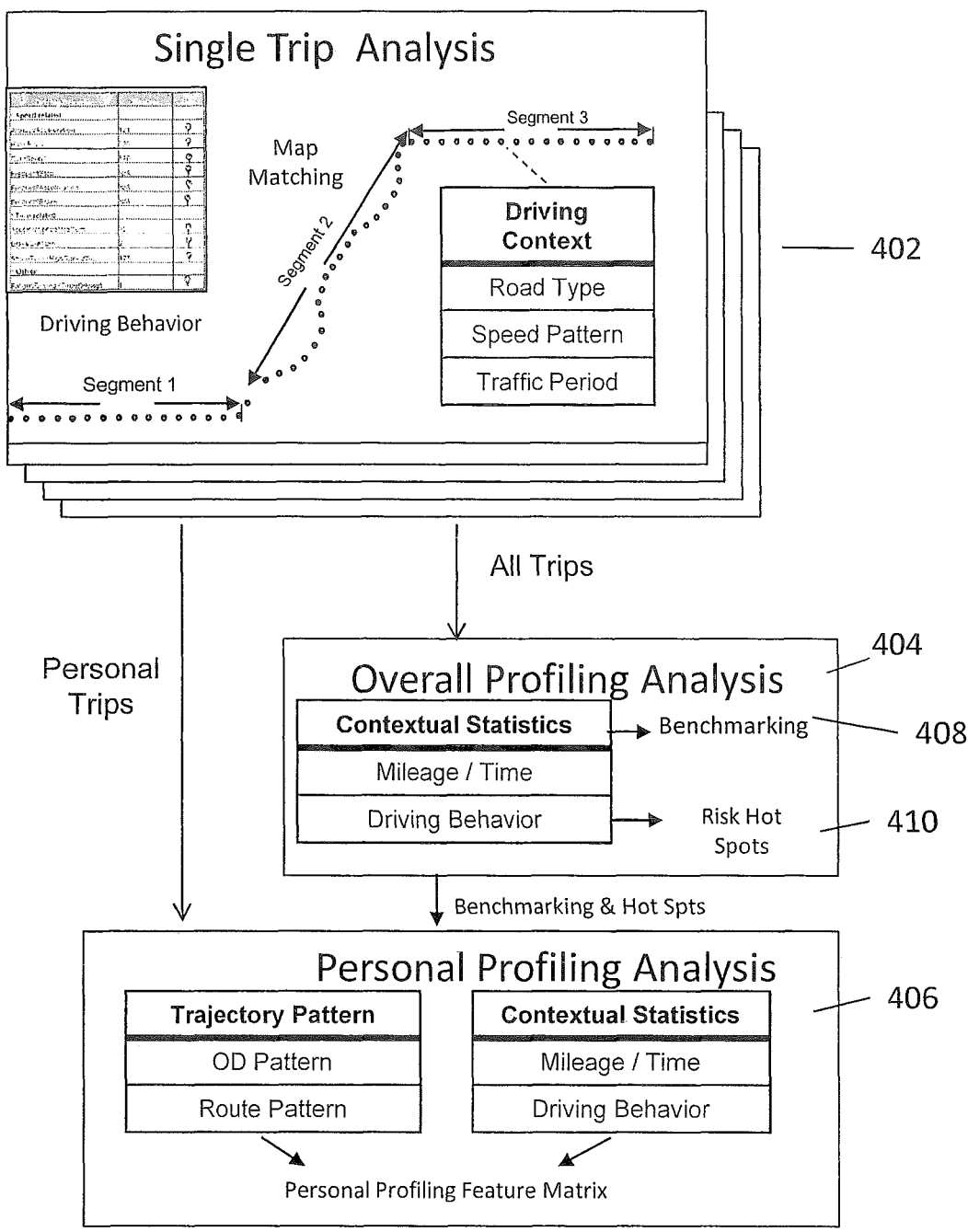
FIG. 4 shows examples 400 of single trip analysis data and their aggregation into overall profiling analysis and personal profiling analysis.

As further shown in FIG. 4, an insurance processing center implementing the UBI model can maintain a historical analysis of each of an insured user's single trips 402. Such trip data can be displayed in various formats including spreadsheet listing(s) of driving behaviors and driving context information. Although only a single user's trip is demonstrated in FIG. 2, it should be clear that such trip information for this user driver could be aggregated as shown in FIG. 4 and that data from different user drivers could be analyzed and compared, as indicated by label 404.

The present inventors have recognized that it could be possible to defraud the UBI insurance company if the user driver had a tool that could send in false information. Such capability might be possible, for example, by an app that had been developed specifically for purpose of permitting a UBI user driver to preset data preferentially to represent good driver data, regardless of information actually available from data from the risk meter app itself.

However, the present inventors have also recognized that, even if trajectories could be forged or incorrect information otherwise provided, a cheating tool could hardly take context, like weather, traffic, etc., into consideration when generating and sending the faked trip data to the insurance processing center, since such contextual association data as weather and traffic is, by definition, out of the control of the vehicle devices. A key idea of the present invention, therefore, is that the insurance processing center would be able to take such context information into consideration in attempting to detect possible fraud.

FIG. 4 shows in graphic format 400 how the single trip analyses 402 for all insured drivers in the insurance processing center's database can be analyzed in an overall profiling analysis 404, so that an individual driver's personal trips can be comparatively analyzed 406 relative to the overall profiling analysis 404. The overall profiling analysis 404 is used to locate benchmarks 408 and risk hot spots 410 for route data in the processing center's database, as further explained in FIGS. 5 and 6.

Figure 5:
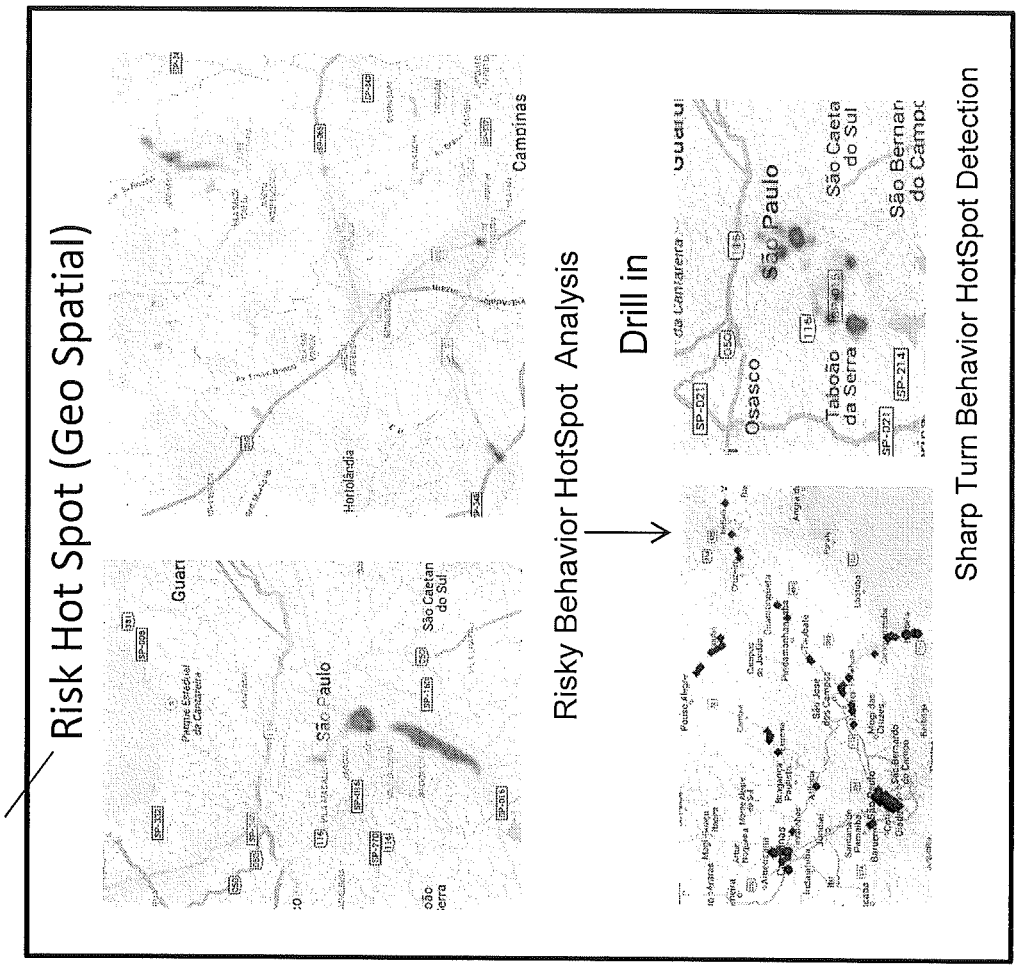
FIG. 5 shows exemplary data 500 for details for risk hot spot detection.

Thus, as further demonstrated in FIG. 5, risk hot spots 410 are specific locations for which concerns, such as sharp turn or harsh braking behavior, that repeatedly show up in driver behavior reports in the database, and such risk hot spots are detectable from routine UBI driving reporting data. As shown in FIG. 6, benchmarks 408 are combinations of conditions and driving context in the trip data that might raise a concern to the insurance carrier, as detected using statistical analysis of normalized driving behavior metrics. As can be seen from the examples, benchmarks (e.g., columns ABC) are identified as being different permutations of driving contextual data parameters, and that such different permutations permit amounts of distance, time, etc., to be identified for each driver and, by extension, for all drivers.

Figure 7:
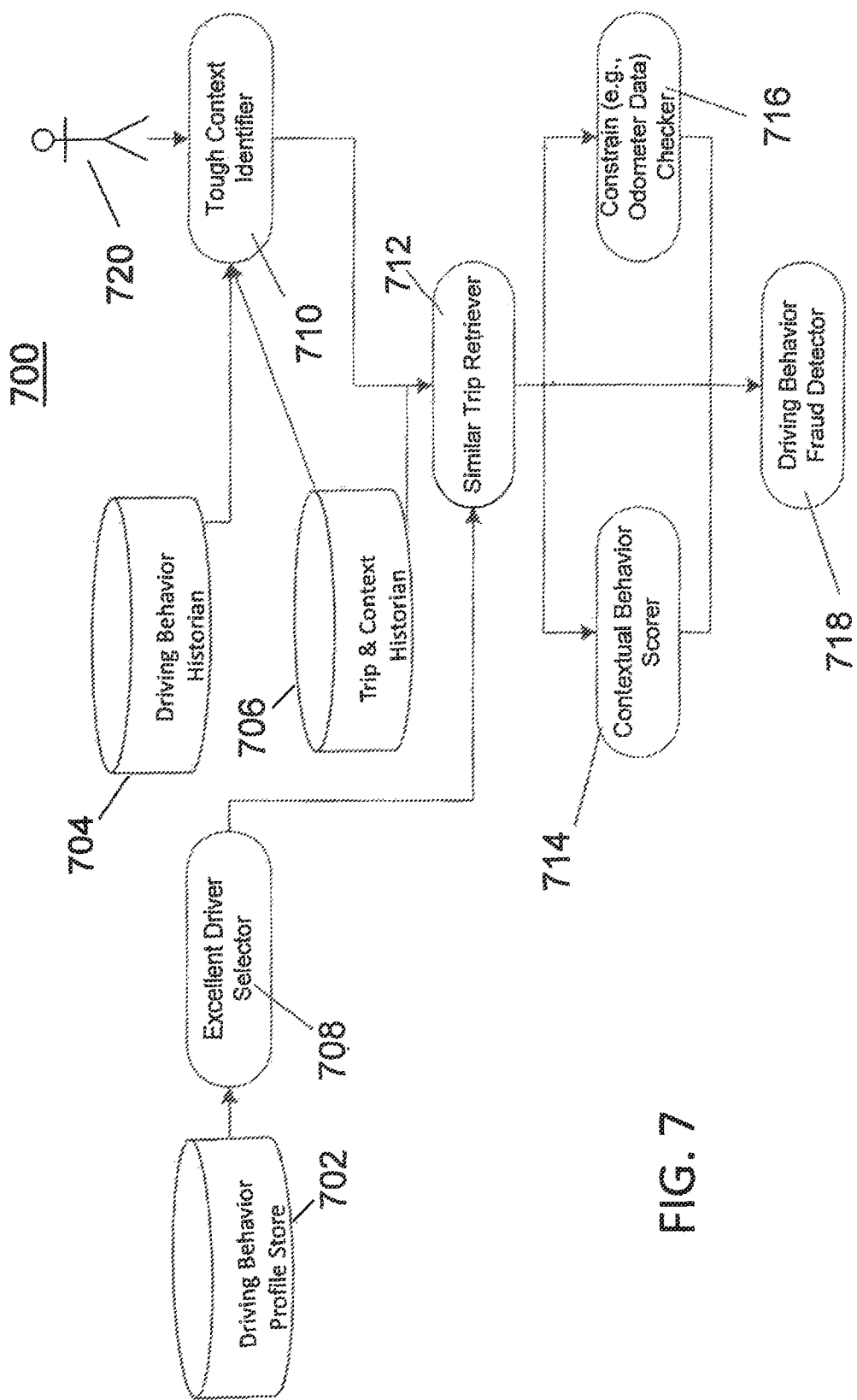
FIG. 7 shows an exemplary flowchart format 700 of the present invention.

FIG. 7 shows an exemplary flowchart presentation 700 of the steps and components of the present invention. The basic fraud detection mechanism of the present invention can be summarized as follows:

(1) For each driver with, for example, a very good driving behavior profile, select his/her trips happening in tough context instances, such as bad weather or visibility, congested traffic, etc. The profile could be due to a repetitive trip made by the driver.

(2) Use statistical methods to model the driving behaviors of similar trips in that context from all drivers having data in the insurance processing center database.

(3) If a specific driver's driving behavior of a trip is statistically far better than others, especially, when there are several such kinds of cases for this specific driver, then the system would mark the driver as a potential fraudster. Some further investigation could be conducted to come to a decision for specific suspect drivers.

The above-summarized mechanism is using both driving behavior allegedly reported or ascertainable at known locations on drivers' trips, as well as contextual information ascertainable about those trips. Such information is available in databases at the insurance processing center, as obtained from trip reports similar to the processing providing the information 400 shown exemplarily in FIG. 4. Thus, as shown in the flowchart of FIG. 7, the method has access to various data stores, including the driving behavior profile store 702, the driving behavior historian store 704, and the trip and context historian store 706. Modules 708, 710, 712, 714, 716, and 718 implement the methods of the present invention, with user 720 inputs into the tough context identifier module 710, and are further described below and in FIGS. 8 and 9.

But first, FIG. 4 shows more details about the derivation of the contents of the personal profiler store 702, the driving behavior historian store 704, and the trip and context historian store 706. As shown in FIG. 4, personal profiling is used to derive insights from aggregated trips of a person in order to better understand and profile the behavior of an individual driver. By performing multiple trajectory pattern analysis of a specific driver's various trips, using the reported locations, etc., the personal profiling module of the present invention can confirm, for example, a repetitive pattern of the driver making daily trips between a home and work locations, thereby building up a driving profile for that individual. In such manner, personal profiles can be developed for different drivers under different context combinations of, for example, road types, speed patterns, and traffic periods. It should be clear that such personal profiles of repetitive trips can be very useful to detect fraudulent data reporting, particularly if the same data is repeated during such trips.

Returning now to FIG. 7, the excellent driver selector module 708, as executed on a processor on a computer, selects, for further evaluation, excellent drivers as determined, for example, by drivers paying lowest premiums. Another method to select excellent drivers would be by using driver profiling data from the personal profiling process by, for example, comparing normalized driving behavior metrics for each driver relative to other drivers' records. The similar trip retriever module 712 retrieves trips that match same or similar tough context conditions or certain spatial-temporal conditions. This retrieval can be implemented by extracting data from similar benchmarks data illustrated exemplarily in FIG. 6.

The tough context identifier module 710 identifies tough contexts in the different driving context categories, for comparing different contexts and different individuals. User 720 can provide manual inputs and instructions into the tough context identifier 710.

The contextual behavior scorer module 714 defines the scoring metrics and executes corresponding calculations to provide context scores for each driver under evaluation. The scoring for each driver can be based on a function involving all kinds of dimensions/events, for example, speed, acceleration, different driving behaviors such as number of harsh braking, frequency of braking, number of stops, sharp turns, and/or anxious accelerations during tough context scenarios, etc. A non-limiting exemplary function to evaluate context scores could be a simple summation of the different dimensions/events, including possibly weighting factors for different dimensions or events.

The constraint checker module 716 performs a reality check by comparing results with additional data such as odometer data. The driving behavior fraud detector module 714 compares and identifies drivers as potential fraudsters when their contextual behavior scores are far better (e.g., beyond a predefined threshold value) than average metrics. The predefined threshold value can be expressed in terms of the average and standard deviation values of the statistical evaluations for the calculations to derive the contextual benchmarks. For example, to judge potential fraud from a single contextual event might require that the driver's behavior be over at least one standard deviation above the average metric. In contrast, if a driver's data shows a number of contextual event scenarios, the threshold might be lower than that used for one event scenario.

Figure 8:
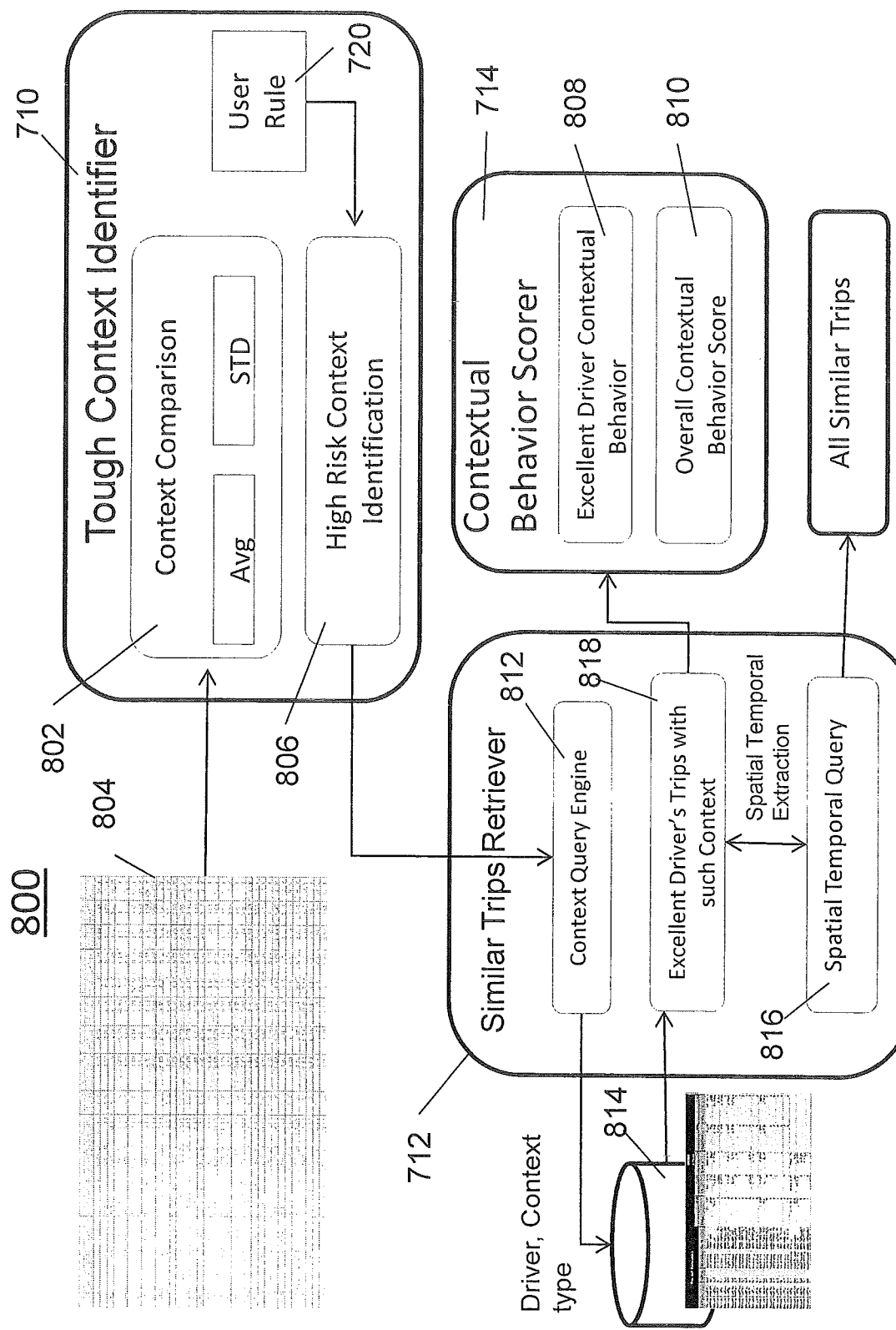
FIG. 8 shows details 800 of the tough context identifier, the similar trips retriever, and the contextual behavior scorer.

As further demonstrated in FIG. 8, tough contexts can be identified by evaluation of the normalized driving metrics 802, based on historical data 804 of all drivers, or from rules, instructions, or data input manually by a user 720. For example, the tough contexts for the traffic category might be "severe congestion", and "congestion" categories. For the weather category, the tough contexts might be, for example, "severe thunderstorm" or "heavy snow" or "icing conditions"; for the time range category, the tough context might be, for example, "morning/evening peak" or "night driving" or "driving while fatigued". The output 806 of the tough context identifier 710 provides an identification of high risk context scenarios.

Further shown In FIG. 8, the similar trip retriever 712 receives the high risk context 806 identified by the tough context identifier 710 and uses tough contexts as search conditions 812 to get matched trips of the selected excellent driver from context pool 814. The similar trips retriever 712 then extracts spatial and temporal features 818 of the trips as conditions to get all similar trips of other drivers, and sends this data 818 to become an input into the contextual behavior score 714.

The contextual behavior scorer 714 calculates an overall contextual behavior score 808 for an individual driver based on an excellent driver contextual behavior score 810 that is, in turn, calculated based on the output of the similar trips retriever 712. Thus, the contextual behavior scorer 714 implements two functions. First, it calculates contextual behavior score 808 for each trip of the excellent driver in tough context scenarios. Second, it calculates the overall contextual behavior score 810 for all similar trips in the same/similar spatiotemporal contextual conditions. The output of the contextual behavior scorer 714 is sent to the driving behavior fraud detector 718.

Figure 9:
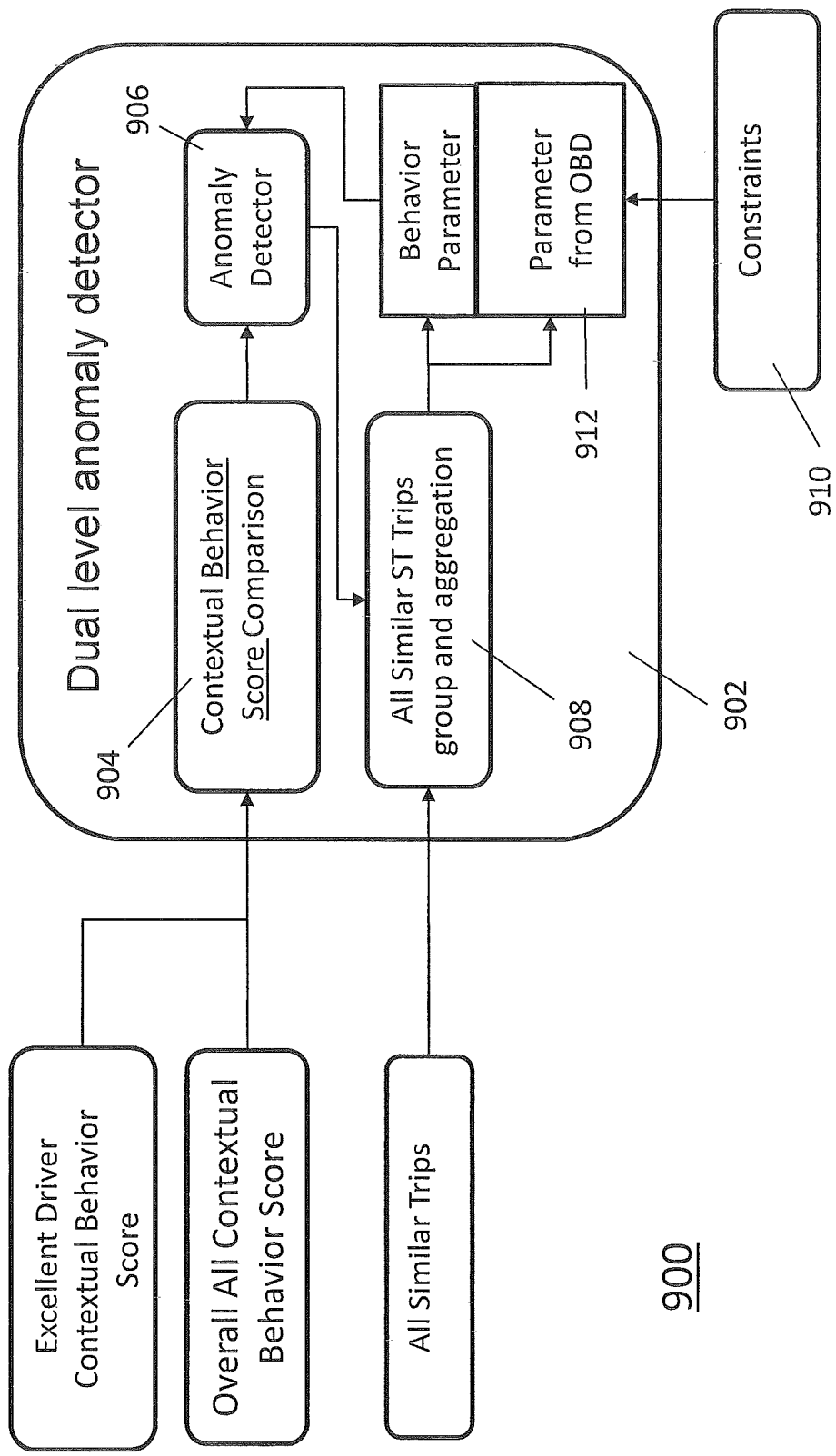
FIG. 9 shows details 900 of the dual level suspicion detector.

In the exemplary embodiment 900 shown in FIG. 9, the driving behavior fraud detector 902 is labeled as a dual level anomaly detector and has two roles. First, it scores for each trip of the excellent driver in tough context; the other role is to calculate the overall contextual behavior score for all similar trips.

The reason for using the "dual level" descriptive in this exemplary embodiment 900 is that there are two levels of information to support anomaly detection, as follows:

1) Contextual behavior score comparison 904 will compare the driver's overall behavior with the excellent driver's score, to detect if the driver's behavior is an anomaly (e.g., the driver's behavior is much more excellent than others) 906. Generally, any statistic approach (e.g., T-test, Z test, Rank Test, or any other kind of hypothesis test), can be used to detect whether the driver's behavior is very different from other drivers' behavior during tough context scenarios. When such driving comparisons are made for same or similar contexts, it is easy to detect when a specific driver's behavior is considerably better. However, based only on such approach, it would be a little difficult to fully judge a driver's anomaly, because the context information is a level of information abstraction (e.g., weather, traffic, road type); with such kinds of abstraction, some driver's behavior may simply be much better than others' driving behavior, and such better driver is worthy of the lower insurance rate.

2) Therefore, to address such concern, in this exemplary embodiment, another level of detection is introduced as a complementary mechanism for driving behavior comparison, an optional optimization feature. In this optimization mechanism, the fraud detection system selects drivers' trips which belong to an anomaly context and uses the spatial temporal information of these selected trips as a constraint. Thus, in this optimization feature, the system focuses on all other drivers' trips in exactly same/similar spatial temporal environment 908. In making this more narrow comparison, along with available OBD data 910 from the suspect driver's contextual incidents, it is possible to further evaluate 912 the driver's behavior in more detail, to detect if such behavior actually does make sense under such specific context.

As an example of how this optional optimization feature might be valuable, consider the following permutation of contextual parameters: Monday morning/peak hour/in New York/5th Avenue/urban road. Under this specific context combination, it would be difficult for a driver to drive very fast. A driver reporting a good driving behavior of reduced speed and frequent stops under such tough contextual instance would only be common sense for a good driver. Thus, without the additional specific spatiotemporal details the driver's conduct might provide a better driving score when compared with other drivers' behaviors under a similar tough context without the specific spatiotemporal details of driving on driving on $5^{th}$ Avenue during Monday morning rush hour in New York City.

Thus, in one exemplary embodiment, this module additionally dually combines spatial-temporal constraints of similar trips, to avoid the occasional case situation when, in some tough context scenarios, a driver's behavior is actually very good because he was actually staying stationary in place and posing no behavior problem. For example, a constraint parameter such as a vehicle running parameter from the vehicle OBD would be able to confirm that the vehicle was actually stationary at the time of the tough context situation being evaluated.

The output of the driving behavior fraud detector 718 is then made available to insurance investigators to use for further investigations and to make final decisions and possible further actions concerning the individuals finally identified by the UBI fraud detection system.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other types of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
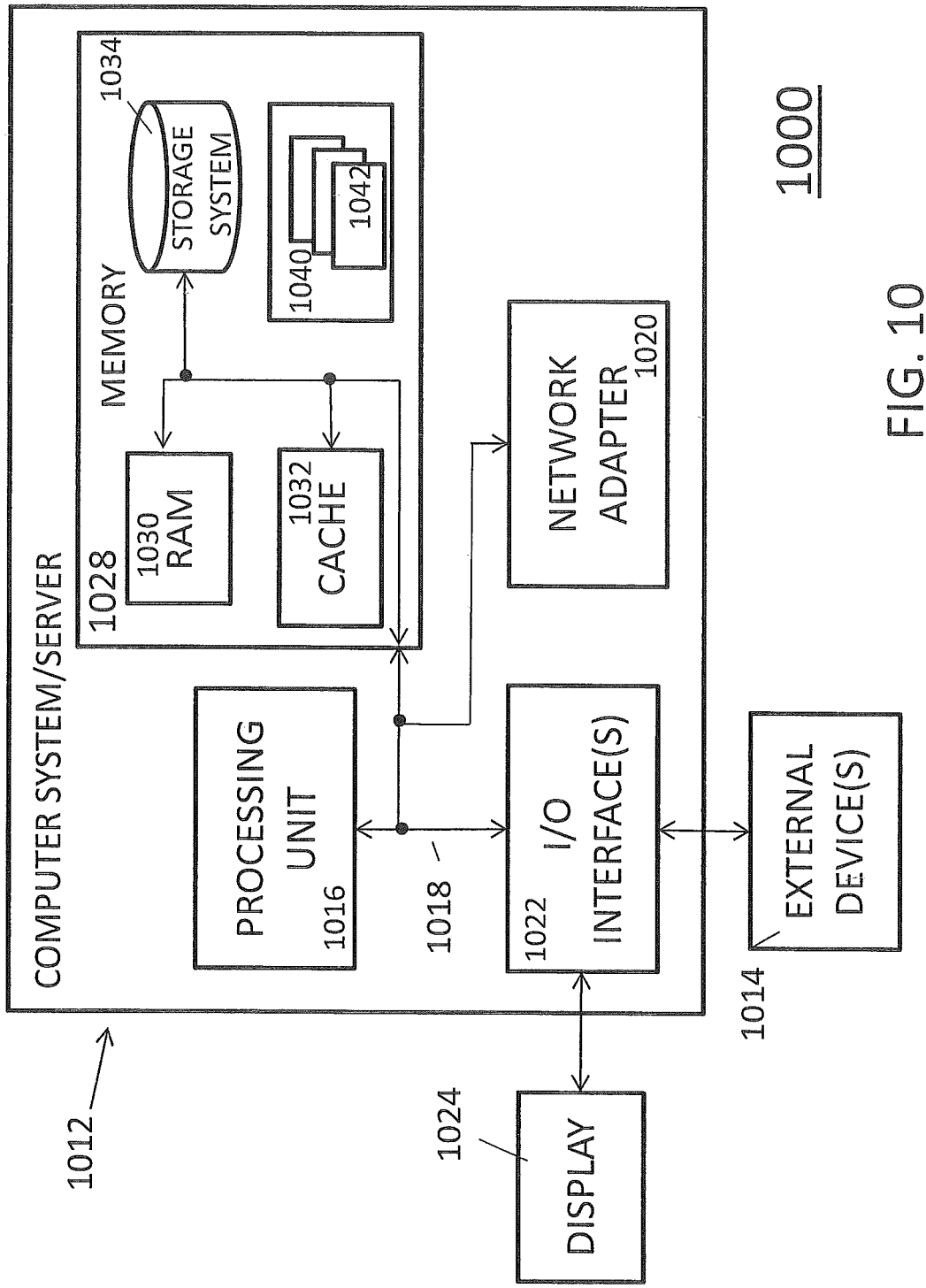
FIG. 10 depicts a cloud computing node 1000 according to an exemplary embodiment of the present invention.

Referring now to FIG. 10, a schematic 1000 of an example of a cloud computing node is shown. Cloud computing node 1000 is only one example of a suitable cloud computing node and is not intended to suggest any limitation as to the scope of use or functionality of embodiments of the invention described herein. Regardless, cloud computing node 1000 is capable of being implemented and/or performing any of the functionality set forth hereinabove.

In cloud computing node 1000 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in cloud computing node 1000 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Figure 11:
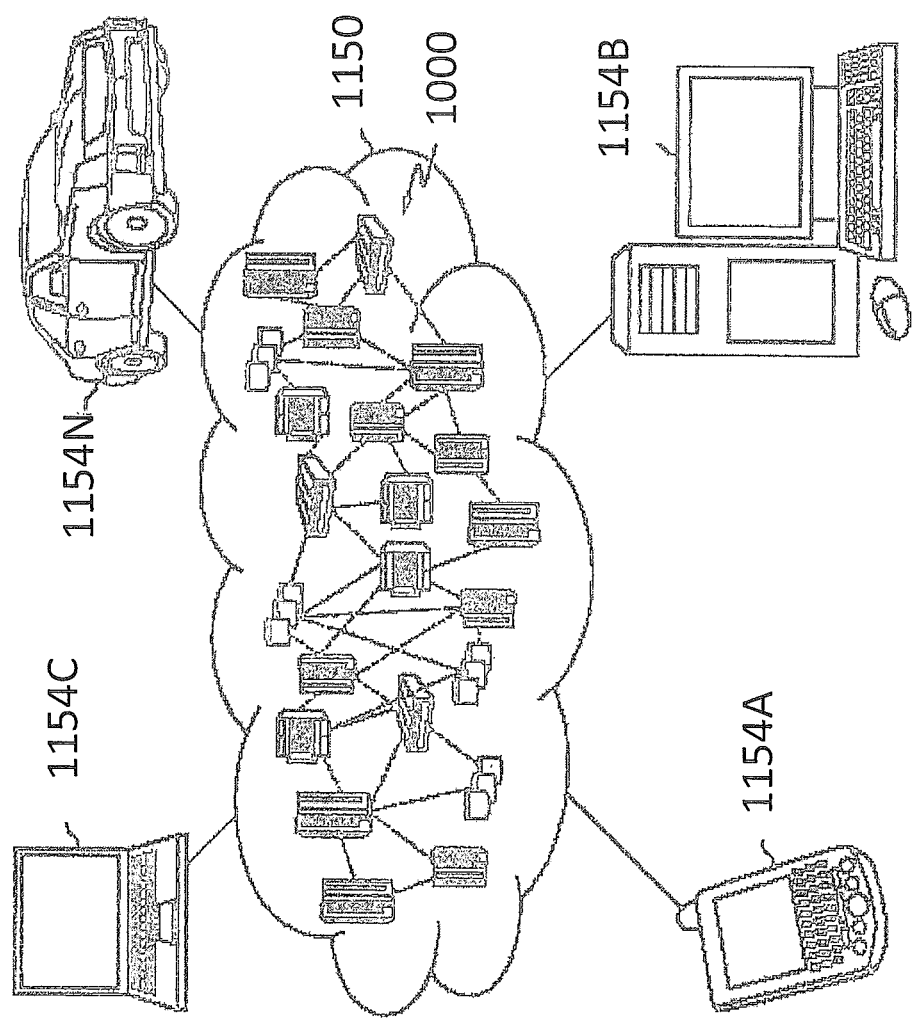
FIG. 11 depicts a cloud computing environment 1100 according to an exemplary embodiment of the present invention.

Referring now to FIG. 11, an illustrative cloud computing environment 1150 is depicted. As shown, cloud computing environment 1150 comprises one or more cloud computing nodes 1000 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1000 and cloud computing environment 1150 can communicate with any type of computerized device over any type of network and/or network addressable connection (e.g., using a web browser).

Figure 12:
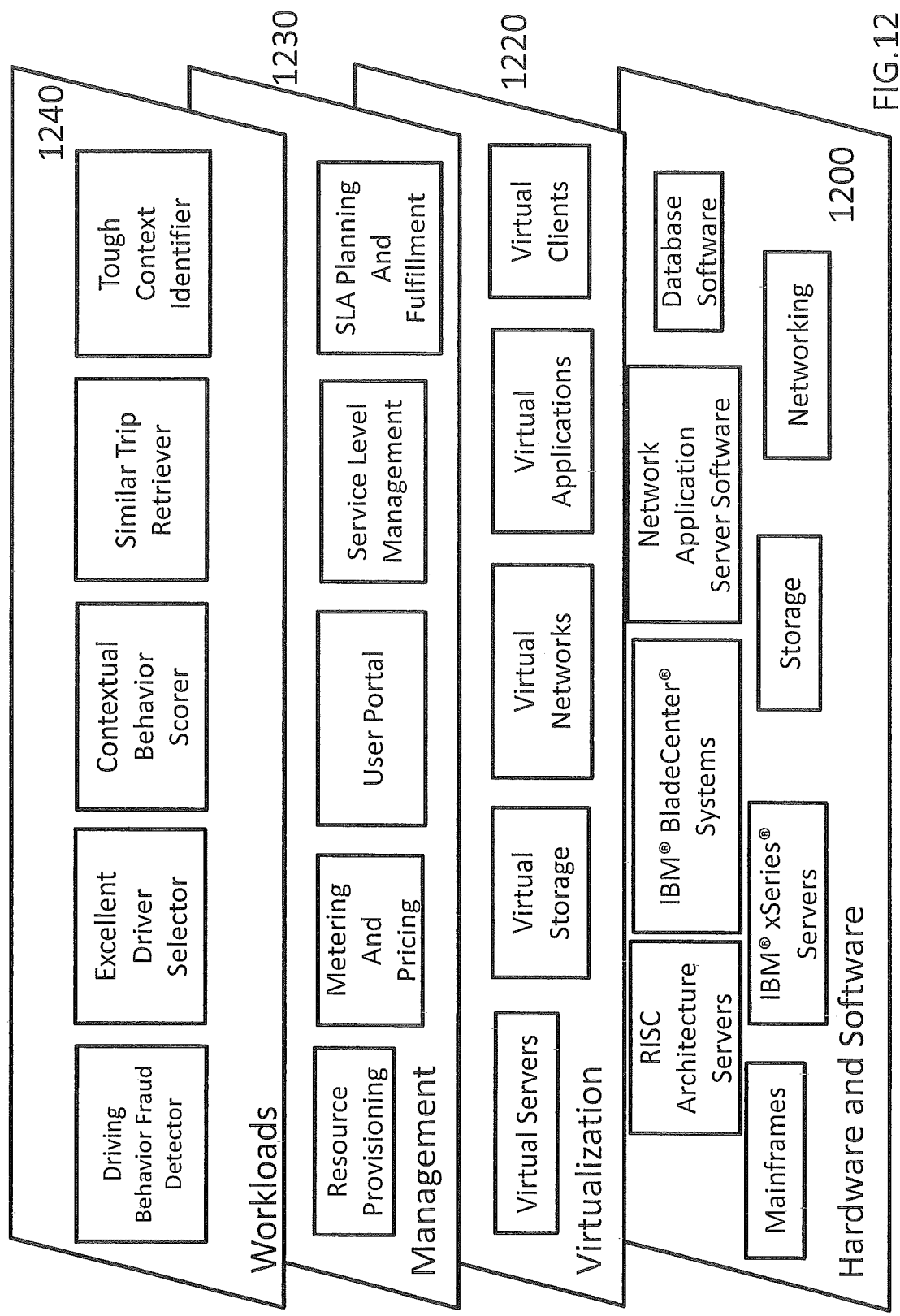
FIG. 12 depicts abstraction model layers 1200-1240 according to an exemplary embodiment of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1200 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 1200.

Virtualization layer 1220 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 1220.

In one example, management layer 1230 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment module provides pre-arrangement for, and procurement of, cloud computing resources for which a future requirement is anticipated in accordance with an SLA.

Workloads layer 1240 provides examples of functionality for which the cloud computing environment may be utilized. Examples of workloads and functions which may be provided from this layer might include any number of functions and applications not even related to the present invention, such as mapping and navigation; software development and lifecycle management; virtual classroom education delivery; data analytics processing; transaction processing; and, more particularly relative to the present invention, fraud detection modules shown in FIG. 6.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting fraudulent trip data by checking a driver's trip data during tough contextual incidents, the method comprising:
   receiving trip data under a Usage Based Insurance (UBI) model for a driver;
   determining, using a processor on a computer, tough contextual incidents in said trip data;
   calculating scoring metrics for said driver during said tough contextual incidents;
   comparing the scoring metrics of said driver during said tough contextual incidents with scoring metrics of other drivers during same tough contextual incidents;
   identifying said trip data as potentially fraudulent trip data if said driver's scoring metrics are better by a predetermined amount, compared to said other drivers' scoring metrics and compared to past trip data under the UBI model; and requesting a human reviewer for further review and to identify the driver as a fraudster when the identifying identifies said trip data as potentially fraudulent trip data, wherein said tough contextual incidents being determined based on one or more of weather conditions, traffic congestion, traffic periods, and driving durations, and wherein spatial-temporal constraints are dually combined, so as to avoid when the driver is stationary in place, further comprising calculating statistics of scoring metrics of other drivers under the same tough contextual incidents wherein said comparing comprises a statistical comparison of normalized scoring metrics.

2. A The method of claim 1, wherein said trip data comprises data transmitted to an insurance processing center under said (UBI) model, and wherein said scoring metrics comprise one or more of the following metrics during the tough contextual incidents: speeds, accelerations, a number of brakings determined to be a type of brakings as based on a comparison with a predefined threshold level of brakings, a frequency of braking, a number of stops, a number of turns determined to be a type of turn as based a comparison with a predefined threshold level of a turn rate, and a number of accelerations determined to be anxious accelerations as based on a comparison with a predefined threshold level of acceleration.

3. The method of claim 1, wherein:

said trip data comprises data transmitted from a risk meter in a vehicle being driven by said driver, said transmitted data is stored in a memory device, and said receiving trip data comprises retrieving said data from said memory device.

4. The method of claim 1, wherein said tough contextual incidents are determined using contextual data, said contextual data comprising at least one of data outside a control of said driver and data concerning conditions or events outside a vehicle being driven by said driver.

5. The method of claim 3, wherein said tough contextual incidents are determined based on parameter values for permutation combinations of different driving contexts, said driving contexts comprising at least road type, speed pattern, and traffic period.

6. The method of claim 1, wherein said trip comprises a first trip, said method further comprising using said trip data to develop a single trip analysis for said first trip, said trip analysis comprising a matrix listing of driving behaviors by said driver along points of said first trip along with driving contextual data along segments of said first trip.

7. The method of claim 6, further comprising:

using available trip data of other trips by said driver and available trip data of trips of other drivers to develop an overall profile analysis; and using said overall profiling analysis to determine risk hot spots along a path of said first trip and to determine benchmarks along said path of said first trip, said risk hot spots comprising locations along said path at which driving behaviors of drivers indicate driving hazards, said benchmarks comprising permutation combinations of different driving contexts including at least road type, speed pattern, and traffic period at which driving behaviors indicate driving hazards, said risk hot spots and said benchmarks indicating driving hazards beyond a preset threshold comprising said tough contextual incidents.

8. The method of claim 7, further comprising:

using said risk hot spots and said benchmarks to develop a personal profiling analysis for said driver by calculating scoring metrics for said driver at said risk hot spots and benchmarks;

calculating scoring metrics statistics for risk hot spot and benchmark data for all drivers;

determining whether said personal profiling analysis for said driver demonstrates a type of driving behavior, as determined by comparing the scoring metrics of said driver to a predetermined threshold value of said scoring metrics statistics;

receiving any available constraint data that might explain any of said driver's type of driving behavior; and outputting said driver's personal profiling analysis as potentially a fraudster if said driver demonstrates the type of driving behavior.

9. The method of claim 1, further comprising a computer program product for resource management, the computer program product comprising a computer-readable storage medium having program instructions embodied therewith, the program instructions executable by a computer to cause the computer to perform the method of claim 1.

10. The method of claim 9, wherein said non-transitory storage device comprises one of:

a memory in a computer storing instructions currently being executed by said computer;

a memory on said computer storing instructions to selectively be executed;

a standalone memory device capable of being inserted into a port of a computer to upload said computer-readable instructions;

a memory in a network server providing a service to download said computer-readable instructions onto another computer accessible to said network server;

a memory in a network server providing a service to perform said method; and a memory in a cloud service providing a service to perform said method.

11. The method of claim 1, wherein said trip data comprises trip data for repetitive trips made by said driver.

12. An apparatus, comprising:

a processor; and a memory device storing a set of computer-readable instructions to perform a method of evaluating driver data as potentially fraudulent, said method comprising:

receiving trip data for a driver;

determining, using a processor on a computer, tough contextual incidents in said trip data;

comparing the scoring metrics of said driver during said tough contextual incidents with scoring metrics of other drivers during same tough contextual incidents;

identifying said trip data as potentially fraudulent trip data if said driver's scoring metrics are better by a predetermined amount, compared to said other drivers' scoring metrics and compared to past trip data under the UBI model; and requesting a human reviewer for further review and to identify the driver as a fraudster when the identifying identifies said trip data as potentially fraudulent trip data, wherein said tough contextual incidents being determined based on one or more of weather conditions, traffic congestion, traffic periods, and driving durations, wherein spatial-temporal constraints are dually combined, so as to avoid when the driver is stationary in place, and wherein said trip comprises a first trip, said method further comprising using said trip data to develop a single trip analysis for said first trip said trip analysis comprising a matrix listing of driving behaviors by said driver along points of said first trip along with driving contextual data along segments of said first trip.

13. The apparatus of claim 12, further comprising a computer in an insurance processing center receiving driver data under a Usage-Based Insurance (UBI) model.

14. The apparatus of claim 12, embodied in a cloud-computing environment.

15. A method of detecting potential fraud under a Usage-Based Insurance (UBI) model, said method comprising:
collecting driver trip data from drivers covered under the UBI model and storing said driver trip data in a memory device, said driver trip data having associated therewith contextual data concerning said trip;
selecting a driver based on payment of an insurance premium below a preset threshold amount;
retrieving data from said memory device for a trip made by said driver;
determining incidents of tough contextual driving during said trip, using said contextual data, said contextual data comprising information including weather and traffic conditions that are not under control of the driver;
calculating scoring metrics for said driver during said tough contextual incidents;
comparing said driver's scoring metrics during said tough contextual driving incidents with scoring metrics of other drivers during same tough contextual driving incidents;
determining whether said driver's scoring metrics during said tough contextual driving incidents is better by a predetermined amount from said other drivers' scoring metrics;
identifying said driver as a potential fraudster if it is determined that said driver's driving behavior exceeds said predetermined amount; and
requesting a human reviewer for further review and to identify the driver as a fraudster when the identifying identifies said trip data as potentially fraudulent trip data,
wherein said tough contextual incidents being determined based on one or more of weather conditions, traffic congestion, traffic periods, and driving durations, and
wherein spatial-temporal constraints are dually combined, so as to avoid when the driver is stationary in place, further comprising:
if said driver's scoring metrics exceed said predetermined amount, retrieving constraint data concerning said scoring metrics, said constraint data comprising scoring metrics of other drivers under a same spatiotemporal condition and a same tough driving contextual incident;
comparing said driver's scoring metrics with scoring metrics of said constraint data; and
determining whether said constraint data provides an explanation for said driver's better scoring metrics.

16. The method of claim 15, wherein said comparing comprises a statistical comparison of normalized scoring metrics.

17. The method of claim 15, further comprising a computer program product for resource management, the computer program product comprising a computer-readable storage medium having program instructions embodied therewith, the program instructions executable by a computer to cause the computer to perform the method of claim 15.

18. The method of claim 1, embodied in a cloud computing environment.

* * * * *